Sept. 27, 1960

A. T. STARR ET AL

PULSE CODING ARRANGEMENTS FOR ELECTRIC COMMUNICATION SYSTEMS 2,954,550

Filed Jan. 10, 1958

4 Sheets-Sheet 1

Inventor
A. T. Starr - K. W. Cattermole - J. C. Price

By R P Morris

Attorney

Sept. 27, 1960

A. T. STARR ET AL

PULSE CODING ARRANGEMENTS FOR ELECTRIC COMMUNICATION SYSTEMS 2,954,550

Filed Jan. 10, 1958

4 Sheets-Sheet 2

Inventor
A.T. Starr - K.W. Cattermole - J.C. Price
By [signature]
Attorney

Inventor
A. T. Starr - K. W. Cattermole - J. C. Price
By [signature]
Attorney

Inventor
A. T. Starr - K. W. Cattermole - J. C. Price
By [signature]
Attorney 2,954,550

PULSE CODING ARRANGEMENTS FOR ELECTRIC COMMUNICATION SYSTEMS

Arthur Tisso Starr, Kenneth William Cattermole, and John Clifford Price, all of London, England, assignors to International Standard Electric Corporation, New York, N.Y.

Filed Jan. 10, 1958, Ser. No. 708,186
Claims priority, application Great Britain Jan. 30, 1957
15 Claims. (Cl. 340—347)

The present invention relates to pulse coding arrangements for electric communication systems.

The object of the invention is to take advantage of the properties of certain magnetic materials having substantially rectangular hysteresis characteristics, such as ferrite materials and certain permalloy materials, to simplify coding arrangements in electric pulse code modulation systems.

It is known that when cores of such material are provided with suitable windings, they can be set in a positively or negatively magnetised condition by the application of appropriate currents to the windings, and when the hysteresis loop of the material is subtsantially rectangular, a nearly constant flux change is obtained when the condition of the core is reversed, and this flux change may be used to generate output pulses. This type of arrangement is then a two-condition trigger device quite similar in its external performance to other two-condition arrangements employing valves, for example.

Such magnetic two-condition devices have already been used for the storage of information.

As will be understood from the detailed description given below, the present invention makes use of the relatively sharp discontinuities of the B—H characteristic of ferrite and similar materials, to determine the boundaries between the amplitude levels of the wave to be coded, and it is not of any importance that the material should have a wide hysteresis loop, or in other words, that the coercive force should be high. In fact, a small coercive force is preferable because the power loss associated with the coding process is then small. Ferrite materials, and the like, satisfy the requirements of the invention because of the sharp discontinuities of the hysteresis loop.

The invention will be described with reference to the accompanying drawings, in which.

Figure 1:
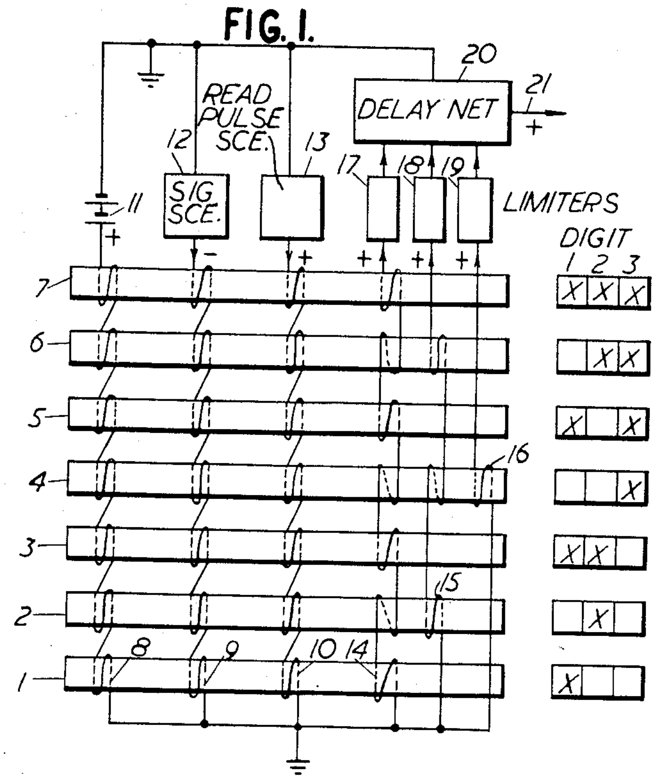
Fig. 1 shows diagrammatically one form of a binary coding arrangement according to the invention.

Fig. 1 shows diagrammatically one example of a coding arrangement according to the invention for a three-element binary code of the ordinary type. Seven similar cores 1 to 7 of ferrite material, or other saturable magnetic material having a substantially rectangular hysteresis loop, are provided. These cores are shown diagrammatically as straight cylinders, so that the arrangement can be clearly understood, but in a practical case they would preferably be of toroidal form, or may be provided by means of holes in a block of ferrite material, as will be explained later.

Each core has a bias winding, a signal winding and a reading pulse winding, respectively designated 8, 9 and 10 for core No. 1. All these windings are wound in the same direction, as indicated, and corresponding windings of the respective cores are connected in series. A direct current bias source 11 supplies a bias current to all the bias windings 8. A source 12 supplies a signal wave to be converted into code groups of pulses to all the signal windings 9, and a source 13 supplies short reading pulses to all the reading pulse windings 10. The reading pulses correspond to the usual sampling pulses, and should have a repetition frequency at least twice that of the highest significant frequency component of the signal wave.

All the windings are shown for clearness as single-turn windings, but it will be understood that each may comprise more than one turn. All the windings 9 will have the same number of turns, and also all the windings 10, but, as will be explained later, each bias winding 8 has a different number of turns. However, according to a modified arrangement to be described below, each bias winding may have the same number of turns.

The cores 1 to 7 are each provided with an output winding, designated 14 on core No. 1, from which windings the digit 1 code pulses are obtained. Digit 1 is the least significant digit. It is to be noted that while the output windings 14 on the odd-numbered cores are wound in the same direction as the signal windings 9 on the said cores, the output windings 14 on the even numbered cores are wound in the opposite direction, as indicated. All the windings 14 are connected in series.

Each of the even numbered cores 2, 4 and 6 is also provided with a second output winding, designated 15 on core No. 2, from which windings the digit 2 code pulses are obtained. The windings 15 on the cores 2 and 6 are wound in the same direction as the signal windings 9, but the winding 15 on the core 4 is wound in the opposite direction. These windings are all connected in series.

Finally the core 4 only is further provided with a third output winding 15, from which the code pulses of digit 3 (the most significant digit) are obtained, and which is wound in the same direction as the signal winding 9 on that core.

All the output windings on all the cores have the same number of turns.

The digit 1, 2 and 3 code pulses, after having been produced in the output windings in the manner explained below, are passed through corresponding amplitude limiters 17, 18, 19, and the digit pulses of each code group will then be produced substantially simultaneously at the outputs of the respective limiters. If it is desired to transmit the digit pulses in succession, the outputs of the limiters may, for example, be supplied to suitable tappings of a delay network 20, so that the digit pulses are obtained at different times at the output 21 of the delay network 20.

The arrangement of Fig. 1 provides for designating eight amplitude values or levels of the signal wave. The signal amplitude is preferably determined at the midpoint of the range between two levels, as will be explained later. Zero amplitude or level corresponds to the production of no digit pulses. The remaining seven levels numbered 1 to 7 correspond to progressively increasing amplitude values, so seven cores are necessary for producing the corresponding seven groups of digit pulses.

These pulse code groups are shown diagrammatically to the right of the respective cores 1 to 7 to which they correspond. In these diagrams a cross represents the presence of a digit pulse in the corresponding digit position, and a blank the absence of a digit pulse. The code will be seen to be the ordinary binary code.

As will be evident to those skilled in the art, the arrangement can readily be extended on the same plan for the production of digit pulses according to a code with any number $n$ of digits, which provides for $2^n$ amplitude levels including zero, and for which $2^n-1$ cores are needed. All the cores will be provided with a winding corresponding to the first digit, and the $2^{(n-1)\text{th}}$ core will have only one winding corresponding to the $n$th digit.

The operation of the arrangement shown in Fig. 1 will be explained with reference to Fig. 2, which shows an ideal B—H characteristic curve with a rectangular hysteresis loop for a core of suitable ferrite or other magnetic material. The corners of the loop are designated 22, 23, 24 and 25.

In this curve, the magnetic induction B is plotted as ordinates against the applied magnetic field H as abscissae. If the core is saturated by a sufficiently large negative field which is afterwards removed, it will be left in the condition corresponding to the point 26 on the B axis. If a positive magnetic field exceeding the coercive force $Hc$ be applied to the core, its condition will be switched to some point on the upper branch to the right of the point 23, and a large change in the magnetic induction will occur which will produce a corresponding pulse of electromotive force in an output winding of the core.

It will be assumed that the quantum difference between the adjacent amplitude levels of the signal wave supplied to the signal windings 9 by the source 12 corresponds to a magnetic field-strength $Hq$ in each of the cores. Then the bias current supplied by the bias source 11, and the numbers of turns of the bias windings 8 on the respective cores, are so chosen that for the core No. $r$, a positive biasing magnetic field $Hb$ equal to $$Hc+(r-\tfrac{1}{2})Hq$$

is provided.

Figure 2:
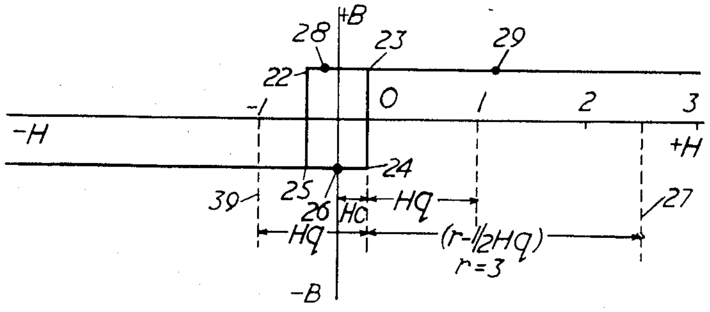
Fig. 2 shows a hysteresis curve used to explain the operation of Fig. 1.

In Fig. 2, part of a scale having steps equal to $Hq$ has been marked on the axis of H, having its zero at the point $Hc$, 0. The dotted line 27 indicates the biasing field for the particular case when $r=3$. In the general case $r$ can have any integral value from 1 to $2^n-1$.

The source 12 should be arranged to supply the signal wave as a negative voltage to signal windings 9, so that it produces a negative magnetic field $-Hs$; that is, a field which is opposite in sign to the biasing field. The effect of the signal field opposed to the bias field is to carry the magnetic state of the core along the upper line of the B—H characteristic curve. If the signal field $H_s$ lies between $(r-\tfrac{1}{2})Hq$ and $(r-\tfrac{1}{2})Hq+2H_c$, then the core is set to some point 28 to the left of the point 23 on the upper part of the curve. In order to read the value of the signal amplitude, a reading pulse consisting of a negative resetting portion immediately followed by a positive reading portion is applied to the reading winding 10. The negative portion should have an amplitude which will produce a field $2H_c$ in the core and the positive portion should have an amplitude exceeding $2^nHq$. The negative portion of the reading pulse carries the condition of the core along the line 22, 25 to some point on the lower portion of the curve, and the positive reading portion carries it back again along the line 24—23 to a point 29 on the upper portion of the curve. Assuming that the core considered has an output winding 14 wound in the same direction as the reading pulse winding 10, then the effect of the complete reading pulse is to produce in the output winding a negative pulse followed by a positive pulse. The unwanted negative pulse is suppressed by the corresponding limiter 17, 18 or 19, which however passes the wanted positive pulse, which corresponds to the change of flux along the line 24, 23.

If the signal field $H_s$ is greater than $(r-\tfrac{1}{2})Hq+2H_c$, the point 28 to which the condition of the curve is set will be already on the lower portion of the curve to the left of the line 25, 22, and the negative portion of the reading pulse shifts it momentarily further to the left, though this is immaterial. The positive portion of the reading pulse carries it to the upper part of the curve, as before, with the generation of a positive pulse in the output winding.

If the signal field $H_s$ is less than $(r-\tfrac{1}{2})Hq$, then the condition of the core is set to a point on the upper portion of the curve to the right of the line 24, 23, and the negative portion of the reading pulse cannot now take it down to the lower part of the curve, so no appreciable flux changes can occur and no output pulses are generated.

When the signal field lies between $(r-\tfrac{1}{2})Hq$ and $(r+\tfrac{1}{2})Hq$, an output pulse is obtained from each of the first $r$ cores, that is, those cores in which the bias is equal to or less than that for the $r^{\text{th}}$ core, but no output pulses are obtained from any of the other cores.

Only the cores 2, 4 and 6 have output windings 15 for the second-digit pulses. Thus, if the signal amplitude is only sufficiently great to allow a pulse to be produced from core 1, no second-digit pulse is produced. If the signal amplitude is sufficiently great to allow a pulse to be produced from core 2, and not from cores 3 to 7, the first-digit pulses in windings 14 on cores 1 and 2 cancel out, but a second-digit pulse is produced in core 2. Similarly, a signal amplitude sufficiently great to cause a change of flux in core 4 but not in cores 5 to 7 does not produce any first-digit pulse due to the opposition of windings 14 on cores 1, 2, 3 and 4 in pairs and does not produce any second-digit pulse due to opposition between the windings 15. A third-digit pulse is produced in winding 16. Any signal amplitude sufficiently great to produce a change of flux in core 5, 6 or 7 will also produce a change of flux in core 4 and will thus give a third-digit pulse.

The output digit pulses referred to above are positive pulses produced in response to the reading portions of the reading pulses, and these digit pulses are passed by the limiters 17, 18, 19. As already mentioned, the negative output pulses due to the resetting portions will be eliminated by the limiters.

In the above explanation it has been assumed for clearness that the hysteresis loop shown in Fig. 2 is rectangular. Actually, while the rectangular form is fairly closely approximated with suitable ferrite materials, there are, in fact, small curves at the corners of the loop, and the line 23—24 which defines the half-level boundaries is not quite parallel to the B-axis. Therefore, for a small range of signal amplitudes near these boundaries, there will be some uncertainty as to on which side of the half-level boundary line the signal level falls. This kind of uncertainty is, of course, characteristic of all binary coders, and steps are taken to reduce the uncertainty to within tolerable limits. In the present case, this is done by arranging so that the magnetic field $Hq$ corresponding to the quantum interval is large compared with the coercive force $Hc$, say several times $Hc$, the multiple depending on the slope of the line 23—24 for the material used and on the maximum limit of uncertainty which is considered tolerable.

This will mean that the magnetic material will be carried rather far into the upper and lower saturation regions during the operation of the coder and, as the lines 22—29 and 24—25 of Fig. 2 actually make a small angle with the H-axis, there will be corresponding small changes of flux in those cores which are not intended to produce any output pulses. These unwanted pulses, being small compared with the wanted pulses, can be eliminated by suitably choosing the lower threshold of the limiters 17, 18, 19, Fig. 1.

However, it is to be noted that some cancellation of these pulses is produced by the fact that the output windings of the cores are wound alternately in opposite directions.

It will be noted that only the portions 28—24—23—29 of the curve of Fig. 2 is used for generating the code pulses, and it is this discontinuity in the curve which is material to the invention. It follows that the value of the coercive force $Hc$ is of no fundamental importance, but it is preferable that $Hc$ should be small in order to reduce the power losses in the core during coding.

Figures 3, 4:
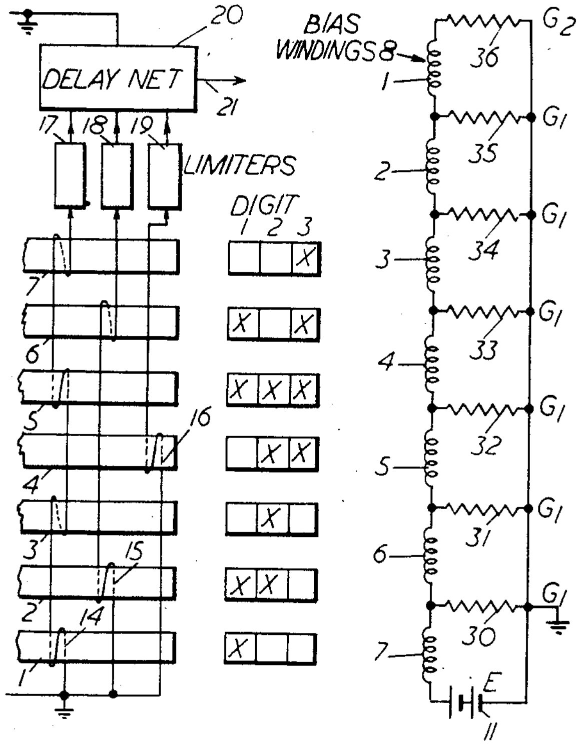
Fig. 3 shows a modification of part of Fig. 1.
Fig. 4 shows an example of a circuit which may be used to bias the cores shown in Fig. 1.

The effects of the lack of precision of the definition of the boundary may be greatly reduced by the use of the cyclic permutation code, which may be produced by a simple re-arrangement of the output windings. Fig. 3 shows a modification of the right-hand portions of the cores 1 to 7 of Fig. 1 to illustrate this re-arrangement. The windings on the left-hand portions of the cores are the same as in Fig. 1. In this case digit —1 windings 14 are provided only on cores 1, 3, 5 and 7, and digit —2 windings 15 only on cores 2 and 6, the windings for each digit being wound alternately in opposite directions. A single digit —3 winding 16 is provided on core 4 as before. It will be noted that this time each core has only one output winding. The corresponding cyclic permutation code groups are shown in the diagrams to the right of the respective cores.

When the cyclic permutation code is used, the lack of precision with which the line 23—24 (Fig. 2) defines the boundary is of much smaller importance than in the case of the ordinary code (Fig. 1), and the uncertainty may in this case be as much as, say, 0.1 $Hq$.

The output windings may be provided on the cores in such manner as to produce any desired form of the binary code. Figs. 1 and 3 only give two examples. It will be noted that, in the case of ascending levels, for each digit, an output winding wound "straight" is placed on the first core which is to produce an output pulse, and then an output winding wound "reverse" is placed on the next core for which no output pulse is required, and then an output winding wound "straight" on the next core which should again produce a digit pulse, and so on.

The following Table I shows schematically the arrangement of the output windings for the code combinations in the case of the standard binary code (Fig. 1), the cyclic permutation code (Fig. 3) and also in the case of an arbitrary form of the binary code.

In the digit columns of this table, the sign "+" represents a winding wound "straight" on the corresponding core, and the sign "—" represents a winding wound "reverse." The code groups are represented in such manner that "1" indicates the presence of a digit pulse, and "0" the absence thereof.

*Table I*

| Core | Standard Code | | | | C. P. Code | | | | Arbitrary Code | | | |
|---|---|---|---|---|---|---|---|---|---|---|---|---|
| | Code | Digit 1 | Digit 2 | Digit 3 | Code | Digit 1 | Digit 2 | Digit 3 | Code | Digit 1 | Digit 2 | Digit 3 |
| | 000 | | | | 000 | | | | 000 | | | |
| 1 | 100 | + | | | 100 | + | | | 100 | + | | |
| 2 | 010 | — | + | | 110 | | + | | 010 | — | + | |
| 3 | 110 | + | | | 010 | — | | | 001 | | — | + |
| 4 | 001 | — | — | + | 011 | | | + | 110 | + | + | — |
| 5 | 101 | + | | | 111 | + | | | 001 | — | | + |
| 6 | 011 | — | + | | 101 | | — | | 101 | + | — | |
| 7 | 111 | + | | | 001 | — | | | 111 | | + | |

It will be seen that the first two sections of Table I agree respectively with the arrangements of Figs. 1 and 3. The third section shows how the windings should be provided on the respective cores for the arbitrary code.

In the case of the arrangement for the cyclic permutation code illustrated in Fig. 3, in which each core has only one output winding, it is possible to obtain the digit pulses of each code group in sequence by an inverse arrangement in which the limiters 17, 18 and 19 are replaced by three corresponding reading pulse sources, not shown.

The three reading pulse sources supply reading pulses in turn respectively to the sets of digit windings 14, 15 and 16. The reading pulse source 13 of Fig. 1 is replaced by a single limiter (not shown) similar to 17, 18 and 19. The windings 14, 15 and 16 (Fig. 3) are however all wound "straight" and the windings 10 of Fig. 1 are wound partly "straight" and partly "reverse" as indicated schematically in the following Table II, in which the symbols have the same meaning as in Table I.

*Table II*

CYCLIC PERMUTATION CODE

| Core | Code | Digit Winding 14 | Digit Winding 15 | Digit Winding 16 | Output Winding 10 |
|---|---|---|---|---|---|
| | 000 | | | | |
| 1 | 100 | + | | | + |
| 2 | 110 | | + | | + |
| 3 | 010 | + | | | — |
| 4 | 011 | | | + | + |
| 5 | 111 | + | | | + |
| 6 | 101 | | + | | — |
| 7 | 001 | + | | | — |

With this arrangement, for each code group, the digit pulses will be obtained in turn from the limiter (not shown) connected to the windings 10. Each reading pulse supplied to the digit windings 14, 15, 16 should consist of a negative resetting portion followed by a positive reading portion, as already explained.

It has already been stated that in the arrangements of Figs. 1 and 3 the bias windings 8 must each have a number of turns proportional to the bias field $$Hc+(r-\tfrac{1}{2})Hq$$

required for the corresponding core. It may thus happen that the number of turns necessary for the bias windings of the cores corresponding to the higher levels is inconveniently large, particularly if the cores are in the form of small toroids. An alternative circuit arrangement for providing the necessary bias fields is shown in Fig. 4. In this case all the bias windings have the same number of turns (in some cases only one turn), and the current through each is made proportional to the bias field required.

In Fig. 4 the bias windings corresponding to the cores 1 to 7 are arranged as series elements of a ladder network, the shunt elements of which comprise six equal resistors 30 to 35 of conductance G1, and a terminating resistor of conductance G2. It will be assumed that G1 and G2 are chosen so small in comparison with the conductance of the coils that the latter can be regarded as substantially infinite.

The ladder network is supplied from a direct current source 11 of potential E which is connected to the bias winding of core No. 7.

As explained above, the bias field required for the $r$th core is $Hc+(r-\tfrac{1}{2})Hq$ in which $r$ can take any integral value from 1 to $2^n-1$. The current through the bias winding of core No. 1 is equal to EG2, and G2 is chosen so that $EG2=k(HC+\tfrac{1}{2}Hq)$ where $k$ is a constant depending on the number of turns of the bias winding and the dimensions of the core. G1 is likewise chosen so that $EG1=kHq$.

The current through the bias windings on successive cores increases by equal steps of EG1, and it will be evident that the current through the $r$th core is $$EG2+(r-1)EG1$$

The corresponding bias field for the $r$th core will be $Hc+\frac{1}{2}Hq+(r-1)Hq=Hc+(r-\frac{1}{2})Hq$, as required.

It will be evident to those skilled in the art, that if the conductance of the bias windings is not so large as to be negligible, the conductances of the resistors 30 to 35 may be graded appropriately to allow for the effects of the coil conductance, so that the current through successive coils increases by equal steps proportional to H$q$.

Figure 5:
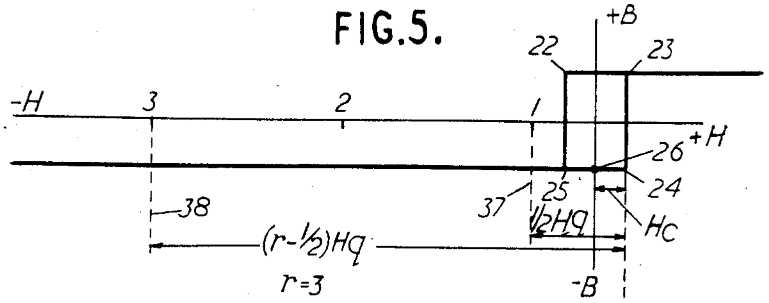
Fig. 5 shows another hysteresis curve used to explain an alternative method of operating the arrangement of Fig. 1.

In the case of time-division multichannel communication systems, the signal waves may be represented by trains of amplitude modulated pulses, and in that case the signal source 12 (Fig. 1) can be arranged to supply these pulses to the windings 9, and then the reading pulse source 13 and the windings 10 are not required. In this case, assuming that the source 12 supplies positive pulses, the source 11 is reversed and is arranged to supply bias currents, either by the arrangement described with reference to Fig. 1, or by that described with reference to Fig. 4, in such manner that the bias field supplied to the $r$th core is $-[(r-\frac{1}{2})Hq-Hc]$. This biasing scheme is illustrated in Fig. 5 which is similar to Fig. 2. The bias of core No. 1 is represented by the line 37 which is spaced at a distance of ½H$q$ to the left of the line 23—24 so that the applied bias is $-(\frac{1}{2}Hq-Hc)$. The bias of the remaining cores increases by steps of H$q$, so that the bias of the $r$th core will evidently be $$-[(r-\tfrac{1}{2})Hq-Hc]$$

as stated above. The bias for core No. 3 is indicated by the line 38 spaced from the line 23—24 by $$2\tfrac{1}{2}Hq-Hc$$

It will be evident, from what has been explained above, that when the amplitude of a signal pulse lies between $(r-\frac{1}{2})Hq$ and $(r+\frac{1}{2})Hq$ the point corresponding to the condition of the core is swept to the right of the line 23—24, and a corresponding output is obtained, in the case of the first $r$ cores, so the code illustrated in Fig. 1 or 3 will be obtained. In order that each core may be left in a condition corresponding to a point on the lower branch of the curve, it is necessary for ½H$q$ to be greater than 2H$c$. Alternatively, if this condition is not fulfilled it may be arranged for each positive signal pulse to be immediately preceded by a negative resetting pulse of sufficient amplitude.

In the arrangements which have been described with reference to Figs. 1 to 5, an output from the $r$th core indicates that the signal amplitude at the time of the reading pulse exceeds the value which produces the magnetic field $(r-\frac{1}{2})$ $Hq$ in that core. In other words the line 23—24 is the lower limit of the $r$th quantum level.

It is however also possible to arrange the conditions so that an output is produced only by the $r$th core, when the signal amplitude is such that the corresponding magnetic field lies within the limits $(r-\frac{1}{2})Hq$ and $(r+\frac{1}{2}\ Hq)$.

This arrangement of conditions is obtained by biasing the respective cores and applying the signal wave in the manner described with reference to Figs. 1 and 2. The reading pulses supplied from the source 13, however, are given an amplitude equal to $Hq$ instead of something greater than $2^nHq$. In that case only the $r$th core will give any output for a signal amplitude corresponding to a magnetic field which lies between $(r-\frac{1}{2})$ $Hq$ and $(r+\frac{1}{2})$ $Hq$. In Fig. 2, the dotted line 39 has been drawn at a distance H$q$ to the left of the line 23—24, and it will be clear that only if the total magnetic field produced by the combination of the bias current and the signal current corresponds to a point between the lines 23—24 and 39 will the corresponding core give any appreciable output with a reading pulse of amplitude H$q$.

The output windings on the cores are arranged as shown in the following Table III for the ordinary binary code, and all are wound in the same direction as the other windings on the cores.

*Table III*

STANDARD CODE

| Core | Code | Digit | | |
|---|---|---|---|---|
| | | 1 | 2 | 3 |
| | 000 | | | |
| 1 | 100 | + | | |
| 2 | 010 | | + | |
| 3 | 110 | + | + | |
| 4 | 001 | | | + |
| 5 | 101 | + | | + |
| 6 | 011 | | + | + |
| 7 | 111 | + | + | + |

It will be seen that the arrangement of the output windings is a copy of the code arrangement, and this will hold whatever form of the binary code is adopted.

Figure 6:
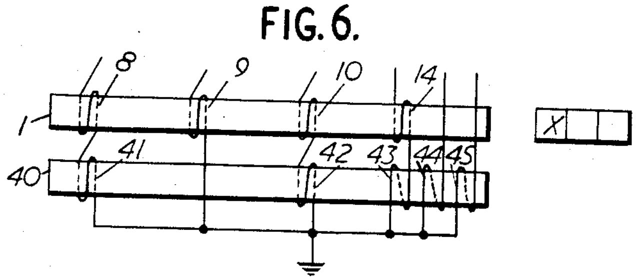
Fig. 6 shows a second modification of part of Fig. 1.

In the operation of the coding arrangements which have been described, it is assumed a core which is set to a point to the right of the line 23—24 (Fig. 2) does not give any output pulse in response to a reading pulse. Actually, a small output may in fact be produced because the line 22—29 is not really parallel to the H-axis, but rises slightly with increasing values of H. However, since in Figs. 1 and 3 output windings for each digit are connected alternately "straight" and "reverse," there will be substantial cancellation of these unwanted output pulses in successive pairs of cores. Thus for example, for level 2 in Fig. 1, no output pulse is required for digit No. 1 and the unwanted pulses also substantially cancel out in cores 1 and 2 in cores 3 and 4, and in cores 5 and 6, but the odd core No. 7 gives a small unwanted output pulse. In order to cancel out such unwanted pulses, which are due to an odd number of output windings in series, an extra cancelling core may be provided as shown in Fig. 6, which shows a modification of the lower part of Fig. 1. The cancelling core 40 is arranged with its windings in series with those of the other cores, of which only core No. 1 is shown in Fig. 6, all the other cores being arranged in the manner shown in Fig. 1. The cancelling core 40 is provided with a bias winding 41, a reading pulse winding 42, and three digit windings 43, 44, 45, but there is no winding corresponding to the signal source 12, the signal winding 9 of the core 1 being connected directly to ground. Windings 41 and 42 are all wound "reverse." The winding 42 has the same number of turns as the winding 10, and the windings 43, 44 and 45 have the same number of turns as the windings 14, 15 and 16 respectively, of Fig. 1.

The number of turns of the winding 41 should be such that the core 40 is biased to a point of little to the right of the line 23—24. That is, the biasing field should exceed H$c$. For example, the core 40 could have the same bias field as the core 1 (Fig. 1), namely $Hc+\frac{1}{2}\ Hq$.

It will be seen from Figs. 1 and 6 that with the additional cancelling core 40 there are now an even number of output windings for each digit connected alternately "straight" and "reverse," so the unwanted output pulses will be substantially cancelled. Since the core 40 is biased to the right of the line 23—24 (Fig. 2) it can never give a large output pulse in response to a reading pulse.

It should be noted that the core 40 is only provided with a winding corresponding to one of the digits if the total number of output windings on the cores 1 to 7 for that digit is odd. Thus for the arrangement shown in Fig. 3 for producing the cyclic permutation code, the core 40 should be provided only with the output winding 45, corresponding to digit 3, since the total number of output windings on the cores 1 to 7 for digits 1 and 2 is even.

If the biasing arrangement shown in Fig. 4 is used, the bias winding 41 of the core 40 may be connected in series with the bias winding of core No. 1 between the resistors 35 and 36.

While the cores shown in Figs. 1, 3 and 6 could in theory be in the form of straight rods, as indicated, in practice inconveniently large magneto motive forces will be necessary to saturate them because the magnetic path is not closed. Thus the cores will preferably be in the form of small toroids, or alternatively, the same results may be obtained by threading wires through suitable holes drilled or moulded in a block of suitable ferrite material, or other magnetic material with a substantially rectangular hysteresis loop, as will be explained below.

Figure 7:
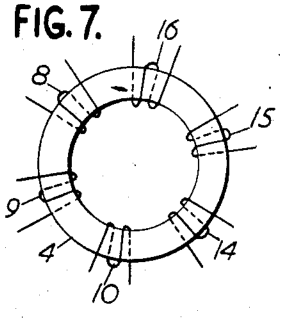
Fig. 7 shows one form which the cores shown in Fig. 1 may take.

Fig. 7 shows an example of a toroidal core corresponding to the core 4 of Fig. 1 on which are wound the six windings 8 to 10 and 14 to 16. It will be noted that the windings 14 and 15 are wound in the opposite direction to the other windings. The other cores would be provided in the same way with one, or two, of the output windings omitted, according to Fig. 1. It is, of course, not essential that the windings should occupy separate sections of the toroid; they have been shown in this way for clearness.

Figure 8:
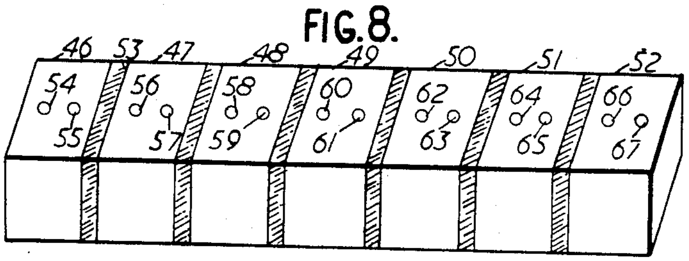
Fig. 8 shows a perspective view of a block of ferrite material which is used in another embodiment of the invention.
Figures 9, 11, 12:
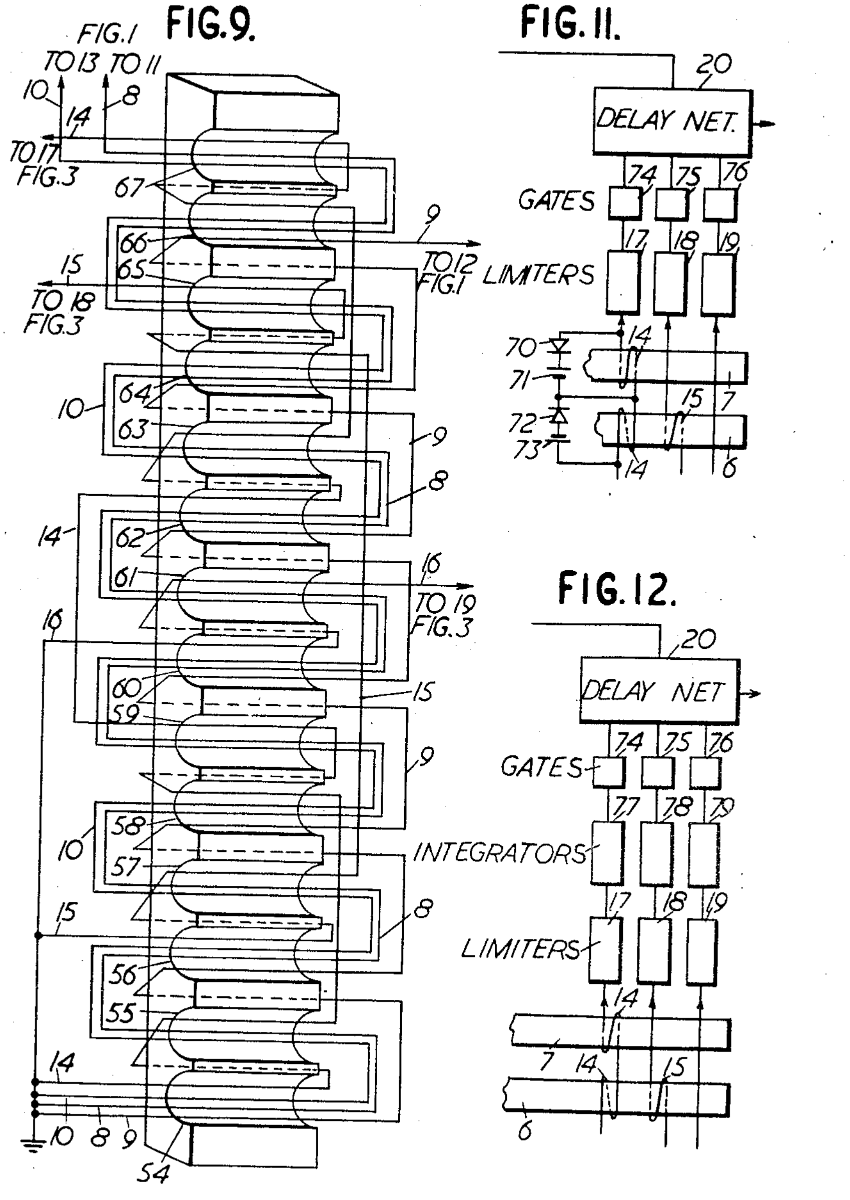
Fig. 9 shows a diagram indicating one method of wiring the block shown in Fig. 8.
Figs. 11 and 12 show two further modifications of part of Fig. 1.

As already mentioned, the arrangement of Figs. 1 and 3 may be provided by suitably wiring a ferrite block having a series of holes drilled in it. This type of arrangement has been disclosed in U.S. application Serial No. 492,982 filed March 8, 1955 where it is applied tc the storage of information. Fig. 8 shows a perspective view of a ferrite block arrangement with a series of holes suitably placed for the purpose of the present invention. Fig. 9 shows a diagram which indicates how the block would be wired to produce the equivalent of the cyclic permutation code arrangement of Fig. 3.

In Fig. 8 there are shown seven similar rectangular blocks of ferrite material 46–52 corresponding respectively to the cores 1 to 7 of Fig. 3. Adjacent blocks are separated by six plates 53 of non-magnetic material. Two parallel cylindrical holes are drilled through each block, the holes being numbered in order 54 to 67. The even numbered hole in each block is wired to produce the digit pulses, and the odd-numbered hole is used for compensating the unwanted output pulses. The odd-numbered holes correspond in function to the extra core 40 shown in Fig. 6, but each is wired separately to neutralise the unwanted pulse produced by the windings of the corresponding even-numbered hole. The arrangement therefore does not depend on the neutralisation obtained from oppositely wound output windings on separate cores as in the arrangement of Fig. 6. It will be evident that the principle of separate neutralisation for each output winding could have been adopted in Fig. 6, but it would require seven extra cores instead of only one.

In Fig. 8, the non-magnetic spacing plates 53 could be omitted if adjacent pairs of holes are spaced sufficiently far apart to avoid appreciable magnetic coupling between them. In that case the arrangement may comprise a single bar of ferrite material provided with seven pairs of holes.

Fig. 9 shows diagrammatically the manner in which the block may be wired to produce the cyclic permutation code. The spacing blocks 53 are not shown in Fig. 9, and this figure is not to be taken as giving any indication of relative dimensions. For clearness the ferrite bar has been divided by a plane through the axes of the holes and the front half removed, so that the course of the wires can be clearly seen.

The holes 54 to 67 are threaded by six separate wires each of which is connected to ground at the left-hand side of the diagram, corresponding to the ground connection at the bottom of Figs. 1 and 3. Each wire is given the number of the corresponding windings of Figs. 1 and 3, and the other ends are connected to the elements 11 to 13 and 17 to 19 of Figs. 1 and 3, as indicated in Fig. 9.

The bias wire 8 and the reading pulse wire 10 are threaded as a pair of zig-zag fashion from left to right through each even-numbered hole, and from right to left through each odd-numbered hole, starting from the lower end of the block. Thus it will be appreciated that the ferrite material surrounding the even and odd-numbered holes is oppositely affected by the bias current and by the reading out pulses. The signal wire 9 is threaded from left to right through each even-numbered hole, and that this may be possible, it has to be wound round behind the block between adjacent even-numbered holes, as indicated by the dotted lines.

Reference to Fig. 3 shows that a digit −1 output winding is required for the odd-numbered levels. For level 1, the digit −1 wire 14 in Fig. 9 is threaded from left to right through each of the holes 54 and 55, the portion behind the block being shown dotted as before. The current in the signal wire 9 affects only that portion of the core 14 which is in the hole 54, but the currents in the bias and reading pulse wires 8 and 10 affect the portions of the wire 14 in both the holes 54 and 55, but in opposite senses, since the current travels in wires 8 and 10 in the holes 53 and 54 in opposite directions. Thus if the signal current in wire 19 is such that no normal large output pulse will be produced from the ferrite material surrounding the hole 54, the unwanted small pulse produced by the reading out pulse in the portion of the wire 14 in the hole 54 is neutralised by a similar small pulse of opposite sense produced in the portion of the wire 14 in the hole 55.

The wire 14 is threaded from right to left through the holes 58 and 59 corresponding to level 3, from left to right through the holes 62 and 63 corresponding to level 5, and from right to left through the holes 66 and 67 corresponding to level 7. Thus, positive output pulses are produced for levels 1 and 5 and negative output pulses for levels 3 and 7, as required by Fig. 3.

The digit −2 wire 15 is threaded from left to right through holes 54 and 57, corresponding to level 2, and from right to left through holes 64 and 65, corresponding to level 6, and therefore produces positive and negative output pulses respectively for these levels, as required by Fig. 3.

The digit −3 wire 16 is threaded from left to right through holes 60 and 61 corresponding to level 4 and so produces a positive output pulse for this level.

It will be noted that the even-numbered holes are each threaded by four wires, and the odd-numbered holes by three wires only, since the signal wire 9 does not go through any of the compensating odd-numbered holes.

In Fig. 9, the bias currents may be supplied to the various sections of the bias wire 8 in a manner similar to that described with reference to Fig. 4, in which each of the windings of the levels 1 to 7 corresponds to the two sections of the wire 8 which pass through the two holes corresponding to the level concerned.

Figure 10:
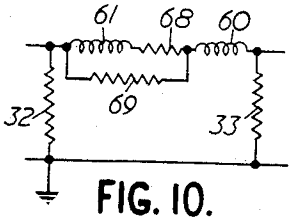
Fig. 10 shows a modification of part of Fig. 4, to illustrate the method of biasing the windings of Fig. 9.

Since, however, the compensating windings in the odd-numbered holes all require the same relatively small bias, the circuit of Fig. 4 may be modified in the manner indicated in Fig. 10, which shows the modification to one mesh corresponding to level 4. In the arrangement of Fig. 9, the wires in holes 60 and 61 correspond to level 4 and are shown in Fig. 10 connected in series between the shunt resistors 32 and 33 of Fig. 4. In Fig. 10, a resistor 68 is connected in series between the windings designated 60 and 61 and a second resistor 69 shunts 61 and 68 as shown. The values of resistors 68 and 69 are chosen so that when the proper bias current flows through winding 60 for level 4, the bias current flowing through winding 61 is such as to produce the desired small bias field, for example $Hc+\frac{1}{2}Hq$. All the meshes of Fig. 4 will be similarly arranged, except that in the last mesh corresponding to level 1, the resistors corresponding to 68 and 69 can be omitted, since in this case both the output and the compensating windings can have the same bias currents.

The resistors have not been shown in Fig. 9 in order to avoid complicating it, but it is believed that it will be evident from Fig. 10 where they should be connected.

Alternatively the portions of the bias wire 8 which pass through the odd-numbered holes in Fig. 9 may evidently be connected all in series in a separate bias circuit (not shown) which provides the required bias current.

The ferrite block shown in Fig. 9 may be wound to produce the ordinary binary code according to Fig. 1 on the same principles. The only difference is that the wire 14 must thread every pair of holes, and the wire 15 must thread the level 4 holes 60 and 61 in addition to threading the levels 2 and 6 holes. This will mean that some of the holes will have more wires threaded through them than are shown in Fig. 9. The direction in which any pair of holes are threaded by the wires 14 and 15 should be from left to right for a "straight" winding and from right to left for a "reverse" winding.

While the arrangement of Figs. 8 and 9 has been illustrated in a form which will produce a three-digit code, it is obvious that the wiring arrangements described can be extended on similar lines to produce a code of more than three digits. For example, for a good quality speech communication system at least five digits are required, and there will be no difficulty in providing a ferrite block or series of blocks of sufficiently uniform characteristics to provide 32 pairs of holes.

A suitable ferrite material for arrangement of Fig. 7 or Figs. 8 and 9 is one having the following composition by weight:

| | Percent |
|---|---|
| $Fe_2O_3$ | 67.3 |
| MnO | 22.6 |
| MgO | 4.9 |
| ZnO | 5.2 |

Alternatively, a permalloy material having the following compositions by weight may be used

| | Percent |
|---|---|
| Nickel | 64.7 |
| Iron | 34.8 |
| Manganese | 0.5 |

When permalloy is used, it should be in the form of tape thin enough for eddy current losses at the desired operating speed to be small. For example, the toroidal core shown in Fig. 7 may be wound from such thin tape. The arrangement of Figs. 8 and 9 may be constructed by means of a number of small extremely thin tubes of the above permalloy material each of which corresponds to one of the holes shown in Figs. 8 and 9. Thin tubes of ferrite material, or layers of ferrite material deposited on small ceramic tubes may be employed in like manner.

While in the embodiments described above, it has been assumed that the signal wave potential is unidirectional, it may easily be arranged to deal with equal series of positive and negative levels of the signal amplitude. For this purpose it is only necessary to provide two similar series of cores (or holes in ferrite blocks) which deal separately with positive and negative signal amplitudes. This will provide $n-1$ digit pulses, the $n$th digit pulse being produced by some suitable means to indicate by its presence that the signal amplitude is positive (for example), its absence indicating that the signal amplitude is negative.

It should also be noted that the quantum interval H$q$ does not need to be constant, but may be graded by appropriately grading the bias currents so that, for example, logarithmic amplitude expansion is obtained whereby the quantum interval is smaller for the lower levels than for the higher levels.

An example will now be given of the application of a coder according to the invention. Suppose that it is desired to provide a multichannel communication system with 24 speech channels in which each channel wave is sampled 10,000 times per second (which is an ample allowance for speech channels). Allowing one extra channel period in each cycle for synchronising, it follows that the sampling rate for all the channels together will be 250,000 samples per second. In the case of a five-element code, the digit pulse period will thus be about 0.8 microsecond, so the digit pulse duration should be about 0.4 microsecond. The arrangements which have been described are easily capable of producing digit pulses of this duration, or shorter, if the magnetic material and its dimensions are suitably chosen.

It should be pointed out that the coercive force Hc tends to increase with the frequency of cycling of the hysteresis loop, so that some possibility of a small adjustment of the bias current may be desirable, for example, by making the resistor 36 (Fig. 4) adjustable, so that if the pulsing speed is changed, the bias can be changed accordingly.

Two other effects which it may be necessary to deal with in some cases are the following:

First, it is assumed that the pulses generated in the output windings of different cores (or different pairs of holes in the ferrite block) are simultaneous. Actually, there will always be a slight delay after the reading pulse, and the delays may not be exactly equal for different cores, so that the desired coincidence of the respective pulses may not occur. To deal with this a limiting rectifier may be connected across one of the output windings of each core as indicated in Fig. 11, which shows a modification of part of Fig. 1. Only the right hand ends of the cores 6 and 7 are shown. A rectifier 70 is connected in series with a bias source 71 across the output winding 14 of the core 7 in such manner that the rectifier is normally blocked. When an output pulse is generated in the winding 14, the rectifier 70 conducts when the voltage amplitude of the pulse equals the potential of the source 71 and is limited to this value. The winding 14 on the core 6 is equipped in like manner with a rectifier 72 and bias source 73 except that they are oppositely poled since this winding is wound "reverse." One output winding on each of the other cores (not shown in Fig. 11) is shunted in like manner by a similar limiting circuit.

The effect of this amplitude limiting is also to lengthen the output pulses so that some overlap of pulses from different cores is obtained. Three output gating circuits 74, 75, 76 are connected respectively between the limiters 17, 18 and 19 and the delay network 20. These gates are normally blocked, but are arranged to be unblocked shortly after each reading pulse when all the output pulses are overlapping. It is evident that if desired, a limiting circuit could be connected across an extra winding on each core, instead of using one of the output windings.

An alternative method of dealing with the lack of coincidence of the output pulses is indicated in Fig. 12, which shows another modification of part of Fig. 1. In this case integrating circuits 77, 78, and 79 and gating circuits 74, 75 and 76 are connected respectively between the limiters 17, 18 and 19 and the delay network 20. The rest of Fig. 1 is unaltered. In this case the output pulses corresponding to each digit are integrated in the circuits 77, 78 and 79 to produce a voltage proportional to the sum of all the pulses generated, which will be substantially zero for an even number of pulses. The gating circuits 77, 78 and 79 are arranged to be unblocked at a time after the corresponding reading pulse when the integrated voltage is substantially established.

A second unwanted effect occurs if the signal wave varies in such manner that it crosses a boundary in the interval between two reading pulses. Then a superfluous output pulse may be generated by one of the cores. This unwanted pulse will be eliminated by the gating arrangements just described.

The circuits of Figs. 11 and 12 are applicable also to the arrangements using holes in a ferrite block which were described with reference to Figs. 8 and 9.

Figure 13:
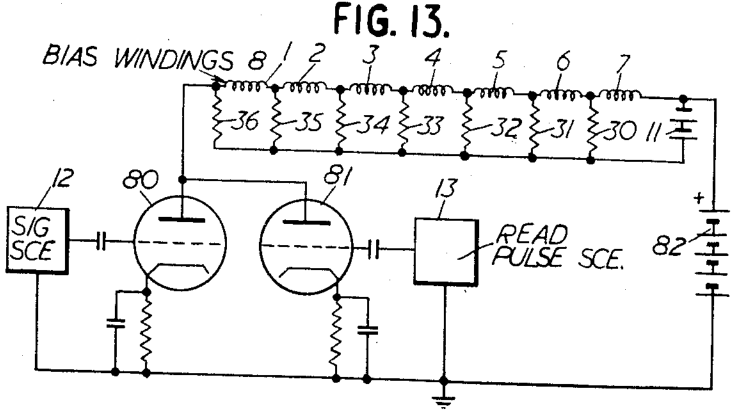
Fig. 13 shows a schematic circuit diagram used to explain another modification of Fig. 1.

Referring to Fig. 1, if the bias windings 8, the signal windings 9 and the reading pulse windings 10 all have in each case the same number of turns, it is possible to employ an equivalent arrangement in which each core has only one winding serving all three purposes. The circuit of Fig. 13 shows how this may be done. The cores are provided only with the bias windings 8 which are supplied with bias currents from a bias source 11 as described with reference to Fig. 4. Two input valves 80 and 81 are provided with their anodes connected through the bias windings of the seven cores to the positive terminal of the high tension source 82. The signal source 12 is connected to the control grid of the valve 80 and the reading pulse source is connected to the control grid of the valve 81. In this way both the signal wave and the reading pulse are supplied to the bias windings. It will be understood that the cores (not shown in Fig. 13) will be provided with output windings 14, 15 and 16 as illustrated in Fig. 1. The operation of the arrangement of Fig. 13 is then substantially as described with reference to Fig. 1.

While the principles of the invention have been described above in connection with specific embodiments, and particular modifications thereof, it is to be clearly understood that this description is made only by way of example and not as a limitation on the scope of the invention.

What we claim is:

1. An electric pulse coding system for generating groups of digit pulses according to a binary code, each group corresponding to a different amplitude level of a complex signal wave, comprising a plurality of two-condition trigger devices corresponding respectively to the amplitude levels, each trigger device including a core of magnetic material having a B—H characteristic curve with sharp discontinuities, means for magnetically biasing the cores of said trigger devices by different amounts corresponding to their respective amplitude levels, means for applying the signal wave to produce in each of said cores a magnetic field having a direction opposite to each of the cores the field produced by said biasing means, means for reversing the magnetic condition of one or more of the trigger devices according to a pattern depending on the level of the signal wave amplitude at a given instant, and means for deriving from those trigger devices whose magnetic condition has been reversed a group of digit pulses corresponding to the said amplitude value.

2. An electric pulse coding system for generating groups of digit pulses according to a binary code in response to a sample of a complex signal wave taken at a given instant, comprising a plurality of similar cores of magnetic material having a substantially rectangular hysteresis loop, means for applying to each core a different biasing magnetic field of a given sign, means for applying the complex wave to produce in each core a signal magnetic field of opposite sign to the bias magnetic field in that core, the signal magnetic field being substantially the same in each core, means for producing at the given instant a sharp change in the magnetic flux of those cores for which the combined bias and signal magnetic field does not exceed the coercive force of the given sign, and means for deriving digit pulses from one or more of the last-mentioned cores in response to the said sharp change in the magnetic flux.

3. An electric pulse coding system according to claim 2 in which the said means for producing a sharp change in magnetic flux is adapted to produce a change in magnetic condition of only that particular core for which the field intensity of the combined bias and signal magnetic fields lies between two given limits, one of which is the coercive force of the given sign, and in which the deriving means is adapted to derive the digit pulses from the said particular core.

4. A system according to claim 2 in which each core is of toroidal form and is wound with a plurality of windings, the complex wave and a bias current being supplied respectively to two of the said windings, and the digit pulses being derived from a third winding.

5. A system according to claim 2 in which each core comprises a block of ferrite material having holes therethrough threaded by a plurality of wires, the complex wave and a bias current being supplied respectively to two of the said wires, and the digit pulses being derived from a third wire.

6. An electric pulse coding system for generating groups of digit pulses according to a binary code of $n$ digits, each group corresponding to a different one of $2^n-1$ amplitude levels of a complex signal wave comprising $2^n-1$ cores of magnetic material having a substantially rectangular hysteresis loop, each core being wound with a bias winding, a signal winding, a reading pulse winding, and one or more output windings not exceeding $n$ output windings, means for supplying a bias current to the bias winding of each core, means for supplying the complex signal wave to the signal winding of each core in such manner that the magnetic field produced in each core is of opposite sign to the bias magnetic field produced by the bias winding, means for supplying a train of reading pulses to the reading winding of each core in such manner that each reading pulse produces a pulse of magnetic field in the core of the same sign as the bias magnetic field in that core, the bias current being supplied to the bias windings in such manner that the bias magnetic fields in the cores increase progressively from the first core to the $(2^n-1)^{th}$ core, the arrangement being such that each reading pulse produces a discontinuous change in the magnetic condition of each of the first $r$ cores only when the signal wave amplitude lies in the $r$th amplitude level, whereby an output pulse is generated in each output winding of each of the said $r$ cores, and means for connecting the output windings of the cores in $n$ separate output circuits corresponding respectively to the $n$ digits of the code, in such manner that a distribution of digit pulses is produced in the said output circuits forming a code group corresponding to the $r$th amplitude level.

7. A coding system according to claim 6 in which each reading pulse is preceded by a pulse of opposite sign for resetting the magnetic condition of the cores.

8. A coding system according to claim 6 in which each core is provided with a single output winding, the output windings of the respective cores being connected in the $n$ output circuits in such manner that digit pulses are produced according to the cyclic permutation form of the binary code.

9. A coding system according to claim 6, in which all the signal windings are connected in series and have the same number of turns, all the reading pulse windings are connected in series and have the same number of turns, and all the bias windings have the same number turns, the said bias windings being connected in a ladder network with resistors to a direct current source, the resistors being so chosen and arranged that the bias currents through the bias windings of the respective cores are graded in such maner as to produce bias magnetic fields in the cores which increase progressively from the first core to the $(2^n-1)^{th}$ core.

10. A coding system according to claim 6 in which the output windings connected in each one of the output circuits are wound on the cores in such direction that an output digit pulse is obtained in the corresponding output circuit only if a reading pulse produces a change in the magnetic condition of an odd number of the cores bearing such output windings.

11. A coding system according to claim 10 comprising an additional compensating core of magnetic material similar to that of which the said $2^n-1$ cores are composed, a bias winding on the said compensating core connected in series with the bias windings of the other cores, a reading pulse winding connected in series with the reading pulse windings on the other cores and having the same number of turns, and one or more cancelling output windings, a corresponding one of the cancelling output windings being connected in series with each one of the $n$ output circuit which includes an odd number of output windings, the compensating core being so biased that the reading pulses do not change the magnetic condition of the core, and the compensating winding being wound in such direction as to neutralise the effects of small flux changes in those of the $2^n-1$ cores whose magnetic condition is not changed by the reading pulse.

12. A coding system according to claim 6 in which the cores are formed in a block of ferrite material and comprise $2^n-1$ pair of holes, the holes of each pair being designated respectively the A hole and the B hole, in which the portions of ferrite material surrounding the A holes constitute the said $2^n-1$ cores, and in which the ferrite material surrounding each B hole constitutes a compensating core for the core corresponding to the A hole of the same pair of holes, comprising a plurality of separate wires threaded through the A holes to form the windings on the said $2n-1$ cores, certain wires also threading the B holes, the arrangement and the magnetic biasing of the cores corresponding to the B holes being such that the effect of small flux changes produced by a reading pulse in an A hole core whose magnetic condition is not changed by the pulse are neutralised by similar small flux changes produced by the pulse in the corresponding B hole core of the pair.

13. A coding system according to claim 12 in which a non-magnetic spacer is inserted between each pair of holes and an adjacent pair of holes.

14. A pulse coding system for generating a plurality of groups of digit pulses according to a binary code, each group corresponding to a different amplitude level of a complex signal wave comprising: a plurality of magnetic two-condition trigger devices, each device comprising a core of magnetic material, a signal winding and one or more output windings magnetically coupled to said core; means for simultaneously energizing with said signal wave the signal windings of each device; means for biasing each core of said plurality of devices with a magnetic flux having a value representative of a predetermined quantized amplitude level of said signal wave; and means for reading said cores at repeated time intervals to produce groups of digit pulses in said output windings representative of said predetermined amplitude levels.

15. A pulse coding system according to claim 14 wherein the means for biasing each core and the means for reading said cores comprise all of said signal windings connected for simultaneous energization.

References Cited in the file of this patent

UNITED STATES PATENTS

| | | |
|---|---|---|
| 2,733,860 | Rajchman | Feb. 7, 1956 |
| 2,734,182 | Rajchman | Feb. 7, 1956 |